United States Patent [19]

Koksbang

[11] Patent Number: 5,506,077
[45] Date of Patent: Apr. 9, 1996

[54] MANGANESE OXIDE CATHODE ACTIVE MATERIAL

[76] Inventor: Rene Koksbang, 700 S. Saratoga Ave., #EE101, San Jose, Calif. 95129

[21] Appl. No.: 77,001

[22] Filed: Jun. 14, 1993

[51] Int. Cl.⁶ .......................... H01M 4/50; C01G 45/12
[52] U.S. Cl. .................... 429/224; 423/594; 423/599
[58] Field of Search ................... 429/224, 122; 423/599, 594

[56] References Cited

U.S. PATENT DOCUMENTS

| | | | |
|---|---|---|---|
| 3,939,008 | 2/1976 | Longo et al. | 429/224 X |
| 4,049,790 | 9/1977 | Horowitz et al. | 429/224 X |
| 4,060,500 | 11/1977 | Clavenna et al. | |
| 4,830,939 | 5/1989 | Lee et al. | |
| 5,135,732 | 8/1992 | Barboux et al. | |

FOREIGN PATENT DOCUMENTS

| | | |
|---|---|---|
| 0390185 | 10/1990 | European Pat. Off. |
| 0554906 | 8/1993 | European Pat. Off. |
| 0581290 | 2/1994 | European Pat. Off. |
| WO94/19836 | 9/1994 | European Pat. Off. |
| 56-071273 | 6/1981 | Japan. |
| 2262241 | 10/1990 | Japan. |
| 5-129019 | 5/1993 | Japan. |

OTHER PUBLICATIONS

International Search Report Form PCT/ISA/210 Dated 6 Jan. 1995 and Mailed 27 Jan. 1995.
G. Blasse, J. Inorg. Nucl. Chem., 1963, vol. 25, pp. 136–137 (No Month).
G. Blasse, Philips Research Reports Supplements, No. 3, Chapter 10, 120–139 (No Month) (1964).
G. Blasse, J. Inorg. Nucl. Chem., 1963, vol. 25, pp. 230–231 (No Month).
G. Blasse, J. Inorg. Nucl. Chem., 1963, vol. 25, p. 743 (No Month).
G. Blasse, J. Inorg. Nucl. Chem., 1964, vol. 26, pp. 1473–1474 (No Month).
G. Blasse, Philips Res. Repts 18, 1963, pp. 400–404 (No Month).
G. Blasse, Solid State Comm., vol. 3, 1965, pp. 67–69 (No Month).
G. Blasse, J. Phys. Chem. Solids, 1966, vol. 27, pp. 383–389 (No Month).
W. H. Cloud, Physical Review, vol. 111, No. 4, Aug. 15, 1958, pp. 1046–1049.
J. C. Joubert et al, Bull. Soc. Franc. Mineral Crist., 87, pp. 517–519 (No Month) (1964).
Chem. Abstracts, vol. 61, pp. 5032–5033, Abstract of Joubert, (No Month) 1964.
A. Lecerf, C. R. Acad. Sc. Paris, 277, 1973, pp. 969–971 (No Month).
Translation of A. Lecerf. Acad. Sc. Paris, 277, (No Month) 1973, pp. 969–971.
A. Lecerf. Acta Cryst. (No Month) 1975, pp. 2487–2490.
A. Lecerf, Acta Cryst. (No Month) 1977, pp. 1896–1900.
H. R. Oswald, (No Month) 1967, English Abstract at pp. 2023–2034, Helv. Chim. Acta, 50.
N. Valverde–Diez, Solid State Ionics 28–30, (No Month) 1988, pp. 1697–1700.

Primary Examiner—John S. Maples

[57] ABSTRACT

A lithium battery has a positive electrode with an active material comprising a manganese oxide compound represented by at least one of the nominal general formulas $A_xZ_yMn_aO_b$ and $A_xMn_aO_b$, where A and Z are each metals or semi-metals, A has a valance of +2, Z has a valence of +1, and where x, y, a and b are each greater than or equal to 1.

23 Claims, 2 Drawing Sheets

5,506,077

MANGANESE OXIDE CATHODE ACTIVE MATERIAL

FIELD OF THE INVENTION

This invention relates to electrochemical batteries and cells, and more particularly to improved positive electrode (cathode) active material mainly composed of manganese oxide compounds.

BACKGROUND OF THE INVENTION

Manganese dioxide ($MnO_2$) has been used as a main material for batteries for many years. The basic components of a lithium manganese oxide cell typically include a lithium anode, a separator or solid electrolyte, and a manganese oxide cathode, typically of $MnO_2$. The cathode usually contains other components such as graphite and an electrolyte binder, to facilitate ionic and charge transport during operation of the cell. Compounds of manganese in the +2, +3, +4, +5, +6 and +7 oxidation states are known, but many are unstable in the solid state. The ion $Mn^{+4}$ (MnIV), is known to be stable in the solid state, although the chemistry of manganese (IV) is not extensive. Virtually, the only stable compound of manganese in this state is the $MnO_2$ which is used as a cathode material. In the reaction of the $Li/MnO_2$ battery, Li+ ion is introduced into the $MnO_2$ crystal lattice. Although the $MnO_2$ oxide may have acceptable capacities for lithium insertion into the lattice, the insertion reaction takes place over a relatively wide voltage range. Therefore, it is not possible to utilize the full capacity of the cathode materials in practical applications. Furthermore, manganese oxides are unstable under conditions of discharge, and when cycling during use is extended from a few cycles to tens of cycles. What is needed is a new cathode active material based on oxides of manganese in a form which maintains capacity and good charge/discharge characteristics over its useful life.

SUMMARY OF THE INVENTION

The present invention provides a lithium battery comprising a cathode active material having as its major component an oxide of manganese and at least one additional metal or metallic element besides the manganese in such oxide compound. In one embodiment, the manganese oxide composition has, besides manganese, one added element designated "A" selected from the group consisting of metal and semi-metal elements, and where A has a valency of +2. Such manganese oxide compounds may be designated by the general formula $A_xMn_3O_8$ where x has the value of 2, or $A_xMnO_3$ where x has the value of 1. Preferably, such compounds are solid solutions comprising a spinel of tetravalent manganese (MnIV). It is preferred that such compounds are selected from the group consisting of $Cu_2Mn_3O_8$, $Ni_2Mn_3O_8$, $Co_2Mn_3O_8$, $Mn_2Mn_3O_8$, $Cd_2Mn_3O_8$, $Zn_2Mn_3O_8$, corresponding to $A_2^{+2}Mn_3O_8$; and $CoMnO_3$, $NiMnO_3$, corresponding to $A^{+2}MnO_3$.

In another embodiment, the cathode active material is a manganese oxide having, besides manganese, two added elements (A and Z) each of which is selected from the group of metals and semi-metal elements, where element A has a valency of +2, and where element Z has a valency of +1. These manganese oxide compounds may be represented by the general formula $Z_yA_xMn_3O_8$, where x is 1 or 2 and y is 0 or 2. Consistent with the manganese oxide ($A_xMn_3O_8$), described above, when x is 2, y is 0, corresponding to $A_2^{+2}Mn_3O_8$; and when x is 1, y is 2, corresponding to $Z_2^{+1}A^{+2}Mn_3O_8$. Such compounds of the general formula $Z_yA_xMn_3O_8$ are preferably one or more of $Cu_2^{+1}Mg^{+2}Mn_3O_8$, $Li_2^{+1}Ni^{+2}Mn_3O_8$ and $Cu_2^{+1}Ni^{+2}Mn_3O_8$. Again, it is preferred that manganese oxides of the general formula $Z_yA_xMn_3O_8$ be solid solutions comprising a spinel of tetravalent manganese.

A preferred lithium cell comprises the positive electrode having an active material of the invention, a negative electrode which is metallic lithium, and an electrolyte which is a solid electrolyte or an electrolyte separator in the form of a polymeric network containing an electrolyte solution comprising a metal salt of lithium.

The manganese oxide based active materials of the invention, facilitate stabilization of the cathode active material structure, so as to prevent the capacity loss which occurs during cycling. Furthermore, the added elements, particularly the transition metal elements, may also undergo reduction during lithium insertion in the cathode active material, whereby a contribution to the capacity of the positive electrode is made.

It is an object of the invention to provide a new cathode (positive electrode) active material for a lithium battery. Another object is to provide a method of making the new cathode material and the battery containing such cathode material.

Another object is to provide a lithium battery having good charge and discharge capacity.

Another object is to provide an improved electrochemical battery based on lithium which maintains its integrity over a prolonged life-cycle, as compared to presently used batteries.

These and other objects, features and advantages will become apparent from the following description of the preferred embodiments, appended claims and accompanying drawings.

DETAILED DESCRIPTION OF THE PREFERRED EMBODIMENTS

In one embodiment, a battery (FIG. 1) having a cathode active material of a manganese oxide compound is prepared having, besides manganese, one added element designated "A" selected from the group consisting of metal and semi-metal elements, and where A has a valency of +2. (FIGS. 2A, 2B) Such manganese oxide compounds may be designated by the general formula $A_xMn_3O_8$ where x has the value of 2. It is preferred that such compounds are selected from the group consisting of $Cu_2Mn_3O_8$, $Ni_2Mn_3O_8$, $Co_2Mn_3O_8$, $Mn_2Mn_3O_8$, $Cd_2Mn_3O_8$, $Zn_2Mn_3O_8$. Other suitable manganese oxide compounds are designated by the general formula $A_xMnO_3$ where x has the value of 1, and preferably are $CoMnO_3$ or $NiMnO_3$. Desirably, such compounds are solid solutions comprising a spinel of tetravalent manganese.

In another embodiment, the active material is a manganese oxide compound represented by the general formula $Z_yA_xMn_3O_8$, where x is 1 or 2 and y is 0 or 2. Consistent with the manganese oxide ($A_xMn_3O_8$), described above, when x is 2, y is 0, corresponding to $A_2Mn_3O_8$. When x is 1, y is 2, resulting in compounds of the general formula $Z_2^{+1}A^{+2}Mn_3O_8$. Such compounds are desirably one or more of $Cu_2MgMn_3O_8$, $Li_2NiMn_3O_8$ and $Cu_2NiMn_3O_8$. Again, it is preferred that manganese oxides of the general formula $A_xZ_yMn_3O_8$ be solid solutions comprising a spinel of tetravalent manganese.

Figures 2A, 2B:
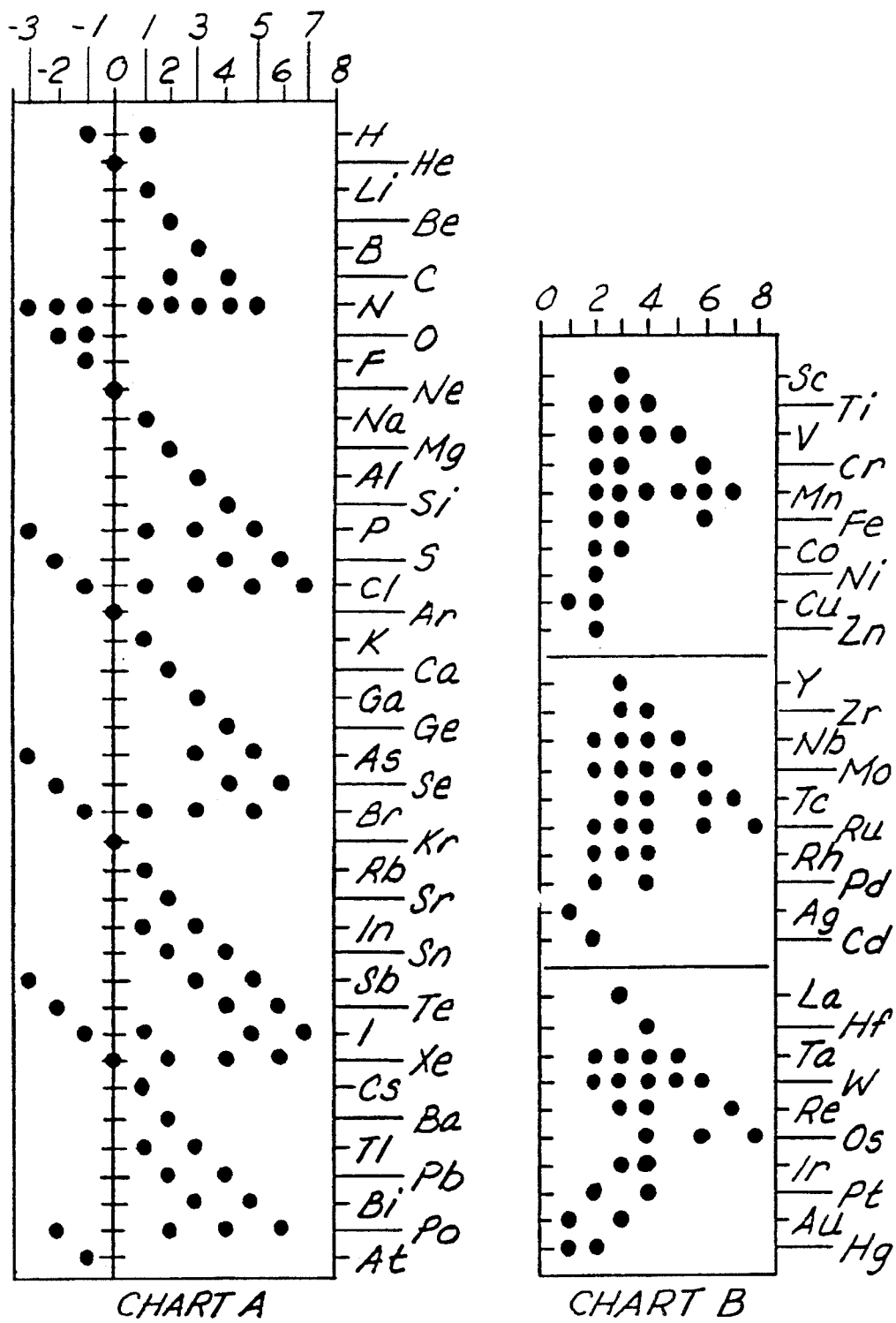
FIGS. 2A and 2B contain charts (a, b) showing common oxidation states of representative elements (a) and transition elements (b).

Thus, the two added elements A and Z, are each selected from the group of metals and semi-metal elements, where element A has a valency of +2, and where the element Z has a valency of +1 (FIGS. 2A, 2B).

I Preparation of $A_xMn_3O_8$ Active Material

Part A: $Cu_2Mn_3O_8$ (A=Cu, x=2)

The new oxygenated compound of the tetravalent manganese: $Cu_2Mn_3O_8$, is prepared from the following key components: $KMnO_4$, $Mn(NO_3)_2$, $H_2O$, CuO and $Cu(NO_3)O_2$. The process begins with preparation of the $KMnO_4$, which is perhaps the best known compound of manganese, potassium permanganate. The process of preparation of the $KMnO_4$ may be found in U.S. Pat. No. 3,986,941 issued in 1976 to Okabe, which is incorporated herein by reference in its entirety. In Okabe's process, a highly pure alkali permanganate is produced at a high yield by electrolytically oxidizing at a temperature of higher than 60° C. a caustic alkali slurry of manganese dioxide and/or an alkali penta-valent manganate having a caustic alkali concentration of 10 to 25% by weight.

The product is the alkali permanganate, $KMnO_4$. The $KMnO_4$ is used along with $Mn(NO_3)_2$, 4 $H_2O$; CuO and $Cu(NO_3)O_2$ to form $Cu_2Mn_3O_8$. The process is according to Andre Lecerf, based on work by G. Blasse, to develop magnetic materials. A. Lecerf's work is reported in "New Ternary Oxygen Compound of Tetravalent Manganese, $Cu_2Mn_3O_8$", *C. R. Acad. Sci.*, Ser. C., 277, 969–971 (1973); and G. Blasse's work is summarized by A. Lecerf therein. A. Lecerf's process and product analysis is as follows. The reaction is carried out at relatively high temperature in a hydrothermal median. Reaction containers used were either glass tubes or gold tubes. Since these two materials are not appreciably attacked by the liquid phase containing a high concentration of nitrate ions. It is possible to simply carry out the reaction in glass tubes.

The specific preparation procedure is as follows. First, an intimate mixture of $KMnO_4$, $Mn(NO_3)_2$, 4 $H_2O$ and CuO is prepared such that the molar ratios of $KMnO_4$ to $Mn(NO_3)_2$ is 2 to 3, and the CuO and Mn are in a ratio of 1 to 1. The mean degree of oxidation of the manganese, at the start, therefore, is equal to 4. This mixture is introduced into the tube and water is added in a proportion of 4 moles $H_2O$ per mole of manganese. The tube is then sealed and brought to a temperature of about 160° C. for about 12 hours. It is then opened and its contents are homogenized. Then a solution of copper nitrate, saturated at 20° C., is added in the proportion of 200 $cm^3$/mole of manganese. The tube is then sealed and brought to a temperature of about 250° C. for about 2 to about 30 days. According to A. Lecerf, the product resulting from this process contains essentially 3 phases: a) hydroxynitrate $CU_2(OH)_3NO_3$; b) a very small quantity of CuO; and c) the new manganese oxide composition: $Cu_2Mn_3O_8$. A washing with normal sulfuric acid made it possible to separate the $Cu_2Mn_3O_8$ product. The product may be characterized as a micro crystalline powder. A few monocrystals of $Cu_2Mn_3O_8$ were also obtained by A. Lecerf by performing the synthesis at 300° C., and by replacing the saturated solution of copper nitrate with a mixture of 120 grams of $CuSO_4$ and 160 $cm^3$ $H_2O$. The time of reaction in this situation was 100 days. The chemical analysis of the new product $Cu_2Mn_3O_8$ was performed. It is thought that the copper was in the divalent state both in the solid, and in the solution used to precipitate the solid in the chemical analysis method of the product. Even considering the very high synthesis temperature of 250° C., A. Lecerf reported the reaction proceeded relatively rapidly, since it was essentially capable of being completed within 2 days. The computed weight percent of copper and manganese in $Cu_2Mn_3O_8$ is 30.26% by weight copper, and 39.24% by weight manganese. Based on chemical analysis of various experimental tests, the compositions produced are as given in Table 1.

TABLE 1

| $Cu_2Mn_3O_8$: Computed in Weight Percent Cu 30.26; Mn 39.24 | | | | |
|---|---|---|---|---|
| Reaction Time | | As Found | | |
| (days) | Cu % | Mn % | d(**) | Density |
| 2 | 30.7 | 38.1 | 4.02 | 5.19 |
| 4 | 30.5 | 38.4 | 4.02 | 5.23 |
| 4* | 30.6 | 38.3 | — | — |
| 11* | 30.6 | 38.4 | — | — |
| 30 | 30.5 | 38.3 | 4.01 | 5.20 |

*Syntheses carried out in gold tubes. The small quantities of product obtained.
**Degree of oxidation of Mn, valence of MnIV.

The copper content is in good agreement with the experimental value, while the manganese content of the experimental value is slightly less than the calculated value. The difference may be explained by a slight substitution of OH for oxygen. The degree of oxidation (valence) of manganese is about equal to 4 (tetravalent). This corresponds to: $Cu^{+2}_2$, $Mn^{+4}_3$ and $O^{-2}_8$ equivalent to +4, +12 and −16. $Cu_2Mn_3O_8$ when heated at a rate of about 150° C. per hour under an oxygen atmosphere, begins to lose some weight at about 500° C. The weight loss seems to end at about 600° C. This produced a spinel phase which had a mixture of Mn(III) and Mn(IV) corresponding to $Cu^{+2}_{1.2}Mn^{III}_{1.6}Mn^{IV}_{0.2}O_4 + 2O_2$. The mean calculated degree of oxidation of manganese in this condition was about 3 to about 3.2, as reported by A. Lecerf.

Part B: $Zn_2Mn_3O_8$, $Cd_2Mn_3O_8$ and $Mn_2Mn_3O_8$ Active Material

Compounds of the general formula $A_xMn_3O_8$ where A=Zn, Cd or Mn and x=2, are described by H. R. Oswald in *Helv. Chim. Acta*, 50, 2023–2034 (1967); and by J. C. Joubert in *Bull. Soc. Fr. Miner. Crist.*, 87, 517–519 (1964). An example of the preparation of such compounds is according to the reaction: $Mn_3Li_2ZnO_8 + ZnSO_4 + 7H_2O \rightarrow Zn_2Mn_3O_8 + Li_2SO_4$ at 300° C.

The Zn is assumed to occupy tetragonal sites and the Mn to occupy octahedral sites of the product spinel. H. R. Oswald describes that the true formula of $Mn_5O_8$ is $Mn_2^+ 2Mn_3^{+4}O_8$. The crystal structure consists of pseudo hexagonal $Mn^{+4}$ sheets with oxygen sheets on either side, giving a rather distorted octahedral coordination to the $Mn^{+4}$ sites. According to H. R. Oswald, every fourth $Mn^{+4}$ is missing in the main layers so that the composition becomes $Mn_3O_8$. Above and below the empty $Mn^{+4}$ sites are either $Mn^{+2}$ or $Cd^{+2}$ completing the composition $Mn_2^{+2}Mn_3^{+4}O_8$ or $Cd_2^+ 2Mn_3^{+4}O_8$, respectively. This double layer structure would also apply to the $Zn_2Mn_3O_8$. According to H. R. Oswald, as the oxygen sheets of adjacent $Mn_3O_8$ layers are not close-packed, the $Mn^{+2}$ or $Cd^{+2}$ obtains an uncommon coordination forming a distorted trigonal prism. With the possibility that some of the $Mn^{+2}$ or $Cd^{+2}$ to oxygen distances are much longer than might otherwise be expected, as the metal atom Mn or Cd is permitted to shift. This gives rise to a very desirable feature of this intercalation active material.

II Preparation of Manganese Oxide Spinel Active Material Containing Tetravalent Manganese ($Z_yA_xMn_3O_8$)

The spinels of the general formula $CuMg_{0.5}Mn_{1.5}O_4$ (corresponding to $Cu_2Mg_1Mn_3O_8$) and $CuNi_{0.5}Mn_{1.5}O_4$ (corresponding to $Cu_2Ni_1Mn_3O_8$) and $LiZn_{0.5}Mn_{1.5}O_4$ (corresponding to $Li_2Zn_1Mn_3O_8$) are prepared according to a process described by G. Blasse in *Solid State Communications*, Vol. 3, 67–69 (1965) and G. Blasse, *Philips Research Reports Supplements*, No. 3, Chapter 10, 120–139 (1964). They were originally prepared by G. Blasse for their magnetic properties. The general method of preparation is by firing intimate mixtures of oxides or carbonates at 650° C. in air or oxygen, and then cooling very slowly. These spinels are commonly described as having a 90° $Mn^{+4}$—$O^2$—$Mn+4$ interaction and the combination of $Cu^++Mn^{+4}$ is said to relatively stable. It is said that the Cu may be present as +2 or +3 and the Mn as +3 or +4. Similar results occur for Cu/Ni and Li/Zn compounds, described above. An example of this can be found in Philips Research Reports Supplements, 1964, No. 3, in which G. Blasse describes general spinels of the formula $Z^{+1}Me^{a+}_{2-t}Me^{b+}_tO_4$, including $LiZn_{0.5}Mn_{1.5}O_4$.

The general method of preparation is to combine oxide and carbonate precursors and sinter at an elevated temperature in an $O_2/CO_2$ atmosphere. The precursors, conditions and product structures are as per Table 2 below.

TABLE 2

| Composition | Raw Materials | Sintering Conditions | Structure* |
|---|---|---|---|
| $LiMg_{0.5}Mn_{1.5}O_4$ | $Li_2CO_3$, $MgCO_3$, $MnCO_3$ | 24 h 750° in $O_2$—$CO_2$ (20:1) | spinel* |
| $LiCo_{0.5}Mn_{1.5}O_4$ | $Li_2CO_3$, $CoCO_3$, $MnCO_3$ | 24 h 750° in $O_2$—$CO_2$ (20:1) | spinel |
| $LiNi_{0.5}Mn_{1.5}O_4$ | $Li_2CO_3$, $NiCO_3$, $MnCO_3$ | 24 h 750° in $O_2$—$CO_2$ (20:1) | spinel |
| $LiCu_{0.5}Mn_{1.5}O_4$ | $Li_2CO_3$, CuO, $MnCO_3$ | 24 h 750° in $O_2$—$CO_2$ (20:1) | spinel |
| $LiZn_{0.5}Mn_{1.5}O_4$ | $Li_2CO_3$, ZnO, $MnCO_3$ | 24 h 750° in $O_2$—$CO_2$ (20:1) | spinel |

*spinel with superstructure

III Preparation of Active Material of the Formula $A_xMnO_3$

Compounds of the formula $CoMnO_3$ and $NiMnO_3$ per W. H. Cloud were prepared as reported in "Crystal Structure and Ferrimagnetism in $NiMnO_3$ and $CoMnO^3$", *Physical Review*, Volume 111, Number 4, 1046–1049 (1958) and by R. C. Toole as described in U.S. Pat. No. 2,770,523 which is incorporated herein by reference in its entirety.

A new active material of the formula $A_xMnO_3$ is a complex oxide of manganese and a metal or semi-metal, preferably a transition metal, where A is Co or Ni. The ratio of atoms of metal M to atoms of Mn may deviate slightly from the ratio of 1:1 as in the known ilmenite-type oxides. By this term is meant that the products have the same type of crystal structure as ilmenite, $FeTiO_3$, which has trigonal symmetry. In ilmenite-type oxides, the ratio of a total of two metal atoms to three oxygen atoms remains substantially constant.

The $A_xnO_3$ manganese oxide active material of this invention are prepared by heating a mixture of manganese dioxide and a simple oxide of cobalt or nickel at a temperature of at least 500° C., under a pressure of at least 1000 atmospheres. A simple oxide contains only one different kind of atom in addition to oxygen, whereas a complex oxide contains at least two different kinds of atoms in addition to oxygen.

(Wells, "Structural Inorganic Chemistry", Second Edition, Clarendon Press, Oxford, England (1950), page 371).

The oxides are preferably prepared in a reaction vessel or container constructed of a material which is inert to the reactants under the reaction conditions, for example, platinum. The container can be either a completely sealed tube having flexible walls or a cylindrical tube closed at one end, and fitted at the other end with a closely fitting piston so that the desired pressure can be exerted on the reaction mixture.

The reactor is charged with a mixture of manganese dioxide and a simple oxide of a metal, for example cobaltous-cobaltic oxide, $Co_3O_4$, or black nickel oxide, NiO. After the corrosion-resistant container is charged with the reactants and an aqueous medium, if one is used, it is closed and placed inside a larger water-filled vessel capable of withstanding high temperatures and pressures. The outer vessel is then closed and the water pressure raised to at least 1000 atmospheres and the temperature of the reaction mixture is raised to at least 500° C. Reaction times are not critical, periods ranging from one to three hours at the above-specified temperatures, are generally suitable. In general, the shorter reaction times are employed with the higher reaction temperature, since excessive heating at the highest temperatures tends to produce some decomposition of the oxide. The oxides can be separated from non-magnetic by-products by physical means and ground to a fine powder.

The tetravalent manganese oxide compounds described above include, besides Mn, at least one other element which is preferably a transition metal. Thus, when two elements are included (A+Z), one is a metal, preferably a transition metal, and the other may be a metal or semi-metal. Metal and semi-metal elements constitute about three-quarters of the Periodic Table. Such metal and semi-metal elements are also commonly referred to as metallic elements. Metallic elements are distinguished from non-metallic elements by their luster, malleability and usual ability to form a positive ion. Semi-metals are also considered in the group as having metallic characteristics, as distinguished from non-metals. Thus, both metals and semi-metals are capable of forming positive ions and are conductors of electricity. Conductivity of semi-metals is small, on the order of 10 to $10^{-5}$ $ohm^{-1}$ $cm^{-1}$. Metals have higher conductivities generally greater than $10^4$ $ohm^{-1}$ $cm^{-1}$. Such metals and semi-metals appear in the left hand part of the Periodic Table and are separated from the non-metals by a diagonal band of semi-metals that run from boron to tellurium. The classification of elements close to this group of semi-metals is not always understood. However, metallic behavior is found among the transition elements, the members of groups I and II, and the heavier elements of groups IIIB, IVB and VB. Transition elements occur between groups IIA and IIIB in the long form of the Periodic Table.

IV Preparation of Electrodes Using the Tetravalent Manganese Oxides

The manganese oxide compound active material of the invention is used to prepare cells with PC-based (polycarbonate) electrolyte binder and lithium anodes.

In a preferred cell assembly, the cathode and anode are placed on opposite sides of a separator/electrolyte or solid electrolyte in a container, thus forming an electrode, electrolyte, electrode assembly or cell.

Figure 1:
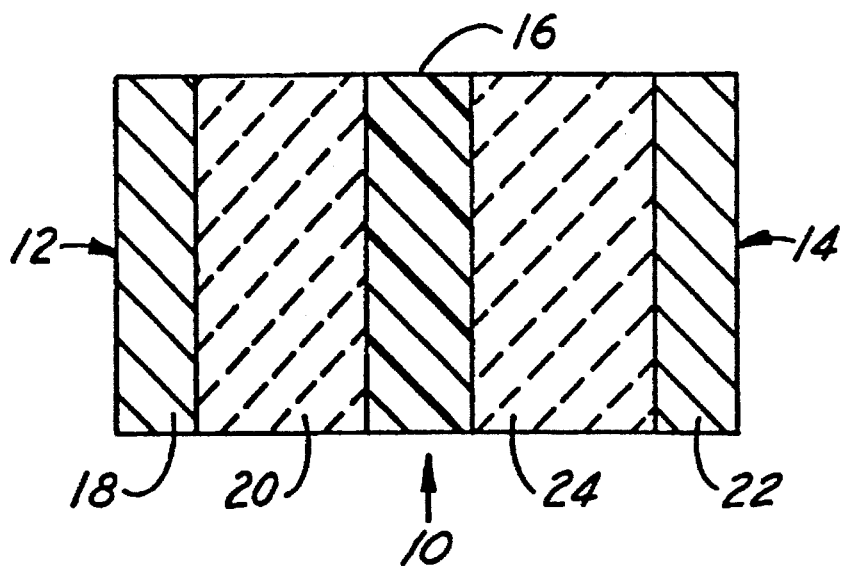
FIG. 1 is an illustration of a cross-section of a thin battery or cell embodying the invention.

As shown in the drawings, an electrochemical cell or battery 10 has a negative electrode side 12, a positive electrode side 14, and a separator 16 therebetween (FIG. 1). In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode. The positive electrode side includes current collector 22, typically of aluminum, nickel, iron, stainless steel, and/or copper foil, or such foils having a protective conducting coating foil, and a body of positive electrode active material 24 which has as its main component one or more oxides of manganese. The positive electrode active material 24 is sometimes simply referred to as the positive electrode. The separator 16 is typically a solid electrolyte, electrolyte separator. A suitable electrolyte separator (polymer electrolyte) is described in U.S. Pat. No. 4,830,939 incorporated herein by reference. The electrolyte separator is a solid organic polymer matrix containing an ionically conducting liquid with an alkali metal salt and the liquid is an aprotic polar solvent. The terms "solid electrolyte" and "electrolyte separator" are used interchangeably in industry. Sometimes, the term "separator" is used.

The manganese oxide was used to prepare cells with lithium-based anodes. Several cells were prepared by mixing the oxide, carbon (typical Shawinigan Black), and electrolyte/binder. Carbon particles for use in electrodes may be obtained from a variety of sources such as Union Carbide, Noury Chemical Corporation, and other major chemical companies. In an as-received condition, such carbon particles have a BET surface area on the order of hundreds of square meters per gram. The particles have an average or median particle size or equivalent average diameter in the range of about 10 to about 100 nanometers (0.01 to 0.1 microns), and typically in the order of 30 nanometers. Thus, the carbon particles are very fine and of submicron size. A typical cathode composition which was used for most of the experiments is as given in Table 3.

TABLE 3

| Typical Cathode Composition | Percent by Weight |
|---|---|
| Manganese Oxide | 45.2% |
| Carbon | 10.3% |
| Propylene Carbonate (PC) | 33.3% |
| PolyEthylene Oxide (PEO) | 1.0% |
| PolyEthyleneGlycolDiAcrylate (PEGDA) | 8.8% |
| TriMethylPolyEthylene Oxide TriAcrylate (TMPEOTA) | 1.5% |

The cathode was coated onto nickel foil followed by electron beam curing (cross-linking/polymerization) of the acrylate component. Then the electrolyte was coated on top of the cathode and cured with ultraviolet light. The lithium electrode was applied on top of the electrolyte separator and the battery was finally placed in a flexible pouch which was heat sealed under vacuum.

To achieve a usable potential difference, the positive electrode is electrochemically oxidized, while the anode is reduced. Thus, during charging, a quantity x (x of lithium ions Li+) are accepted or intercalated into the positive electrode active material of the invention. It is thought that when this occurs, the oxidation state of the manganese changes upon lithium insertion from a +4 condition (Mn(IV)) to a +3 condition (Mn(III)). Thus, in an initial state, the active material contains MnIV having a valence (+4) greater than that of either other added element A (+2) or Z (+1). During operation, the valence state of Mn changes to MnIII (+3), and the valence state of Mn is still greater than, or at least not less than that of A (+2) or Z (+1). The ionic and charge distribution in the active material of the invention in principal, and according to accepted theory is thought to be as per the following example for $A_2Mn_3O_8$ compounds.

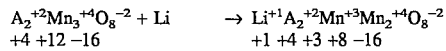

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A positive electrode for a lithium battery, said positive electrode having an active material comprising a manganese oxide compound represented by the nominal general formula $A_xZ_yMn_3O_8$ where x and y are each greater than or equal to one and A and Z are different from one another and are each selected from the group consisting of metal and semi-metal elements.

2. The positive electrode according to claim 1 wherein x has a value of 1 and y has a value of 2, resulting in the nominal general formula $Z_2AMn_3O_8$.

3. The positive electrode according to claim 1 wherein A is selected from the group consisting of Cu, Ni, Co, Mg, Ca, Sr, Zn, Cd, and Mn and wherein Z is selected from the group consisting of Cu, Li, Na, and K.

4. The positive electrode according to claim 3 wherein Z is selected from the group consisting of Cu, Na, or K.

5. A positive electrode for a lithium battery, said positive electrode having an active material comprising a manganese oxide compound represented by the nominal general formula $A_xZ_yMn_3O_8$ where x and y are each greater than or equal to 1 and A and Z are different from one another and are each selected from the group consisting of metal and semi-metal elements other than lithium.

6. The positive electrode according to claim 5 wherein A is selected from the group consisting of Cu, Ni, Co, Mg, Ca, Sr, Zn, Cd, and Mn and Z is selected from the group consisting of Cu, Na, and K.

7. The positive electrode according to claim 5 wherein A and Z are each selected from the group of transition metals.

8. The positive electrode according to claim 5 wherein Z is copper, y is 2, and x is 1 resulting in the nominal general formula $Cu_2AMn_3O_8$.

9. The positive electrode according to claim 8 wherein A is selected from the group consisting of magnesium (Mg) and nickel (Ni), resulting in the nominal general formulas $Cu_2MgMn_3O_8$ and $Cu_2NiMn_3O_8$.

10. A positive electrode for a lithium battery, said positive electrode having an active material comprising a manganese oxide compound represented by the nominal general formula $AMn_3O_8$ where A is selected from the group consisting of metal and semi-metal elements.

11. The positive electrode according to claim 10 wherein A is selected from the group consisting of Cu, Ni, Co, Mg, Ca, Sr, Zn, Cd, and Mn.

12. The positive electrode according to claim 10 where A is a transition metal.

13. A positive electrode for a lithium battery, said positive electrode having an active material comprising a manganese oxide compound represented by the nominal general formula $A_xMnO_3$ wherein x is greater than 1 and A is selected from the group of metal and semi-metal elements.

14. The positive electrode according to claim 13 wherein A is selected from the group consisting of Cu, Ni, Co, Mg, Ca, Sr, Zn, Cd, and Mn.

15. A positive electrode for a lithium battery, said positive electrode having an active material comprising a manganese oxide compound represented by the nominal general formula $AMnO_3$ wherein A is a transition metal.

16. The battery according to claim 15, wherein A is selected from the group consisting of Co and Ni.

17. A lithium-based battery having a negative electrode, a manganese oxide-based positive electrode, and an electrolyte therebetween, wherein the positive electrode comprises tetravalent manganese oxide, and besides the manganese oxide, a single added element (A), or two added elements (A and Z), and when a single element (A) is selected, such element is a transition metal, and when two elements (A and Z) are selected, such elements (A and Z) have respective valences of +2 and +1 and are each selected from the group consisting of metal and semi-metal elements.

18. The battery according to claim 17 wherein the two selected elements A and Z are each selected from the group consisting of metal and semi-metal elements except lithium.

19. A positive electrode for a lithium battery, said positive electrode having an active material comprising a manganese oxide compound represented by the nominal general formula $A_2Mn_3O_8$ where A is a transition metal.

20. The positive electrode according to claim 19 having an active material comprising a manganese oxide compound selected from the group consisting of $Cu_2Mn_3O_8$, $Ni_2Mn_3O_8$, $Co_2Mn_3O_8$, $Mn_2Mn_3O_8$, $Cd_2Mn_3O_8$, and $Zn_2Mn_3O_8$.

21. A positive electrode for a lithium battery, said positive electrode having an active material comprising a manganese oxide compound represented by the nominal general formula $AMn_3O_8$ where A is a transition metal.

22. A positive electrode for a lithium battery, said positive electrode having an active material comprising a manganese oxide compound selected from the group consisting of $CoMnO_3$ and $NiMnO_3$.

23. A positive electrode for a lithium battery, said positive electrode having an active material comprising a manganese oxide compound selected from the group consisting of $Cu_2Mg_1Mn_3O_8$, $Cu_2Ni_1Mn_3O_8$, and $Li_2Zn_1Mn_3O_8$.

* * * * *